March 19, 1929. H. B. WOERNER 1,705,798

ULTRA VIOLET RAY MACHINE

Filed Dec. 14, 1927

INVENTOR,
Harman B. Woerner,
By Minturn & Minturn,
Attorneys.

Patented Mar. 19, 1929.

1,705,798

UNITED STATES PATENT OFFICE.

HARMAN B. WOERNER, OF TERRE HAUTE, INDIANA.

ULTRA-VIOLET-RAY MACHINE.

Application filed December 14, 1927. Serial No. 240,048.

This invention relates to means for producing ultra-violet rays and has for its primary object, the furnishing of such means in a very simple, effective structure at an extremely low cost of production.

The invention is described hereinbelow in reference to the accompanying drawing, in which—

Figure 1:
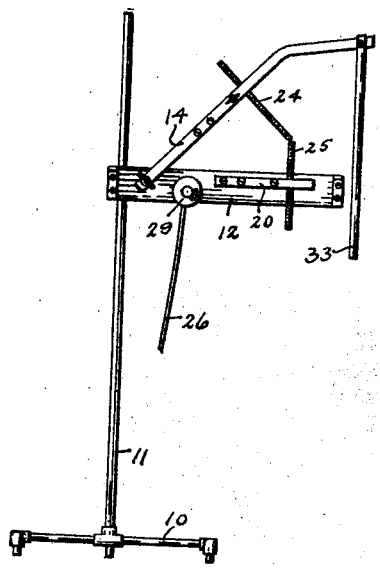
Figure 2:
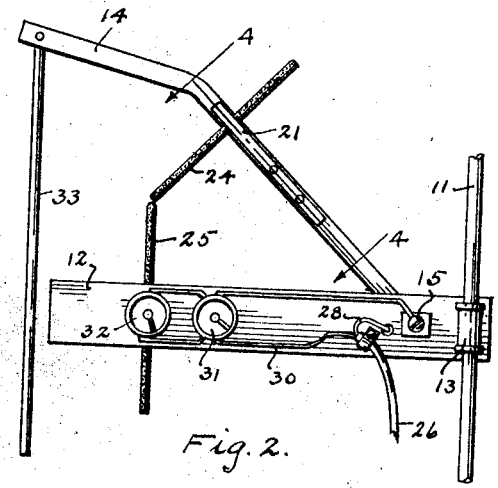
Figure 3:
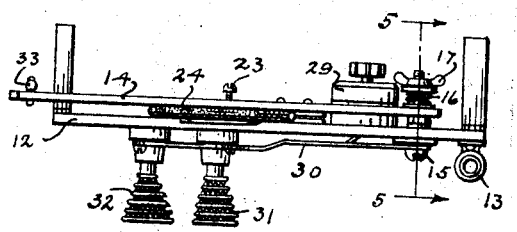
Figure 4:
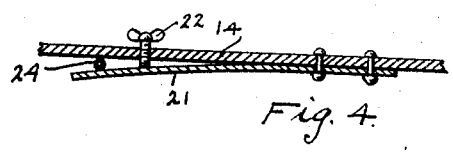
Figure 5:
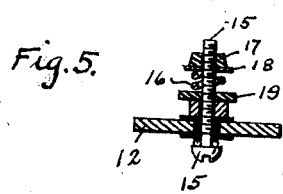

Fig. 1, is a front elevation of a device embodying my invention;

Fig. 2, an enlarged rear elevation of the upper structure of the device;

Fig. 3, a top plan view of the device;

Fig. 4, a section on the line 4—4 in Fig. 2;

Fig. 5, a section on the line 5—5 in Fig. 3; and

Figure 6:
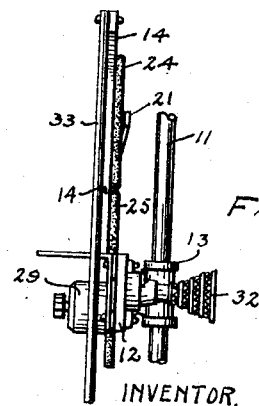

Fig. 6, an end elevation of that part of the device as shown in Fig. 2.

Like characters of reference indicate like parts throughout the several views of the drawing.

On a stand having a base 10 and a vertically extending post 11, I mount a horizontally extending bar 12 by means of a bracket 13 fixed to the bar 12 at one end and slidingly passed over the post 11 whereby the bar 12 may be raised or lowered on the post 11, or swung horizontally around the post 11, and the bar 12 will remain at any elevation on the post 11, by reason of the outer end of the bar 12 tending to drop downwardly which causes the bracket 13 to grip the post.

Near the bracket end of the bar 12, I pivotally attach an arm 14 on the bolt 15 and place a spring 16 on the bolt to be compressed by the thumb nut 17 against the arm 14 through the washers 18 and 19, so that the arm 14 may be swung about the bolt 15 and will remain at any position to which it may be moved. Spaced out on the bar 12 from the bolt 15 is a spring clip 20, and a similar spring clip 21 is carried by the arm 14. Screws 22 and 23 are screw-threadedly passed through the arm 14 and bar 12 respectively to bear against the clips 21 and 20 so that by passing the screws through the bar and arm the clips may be pressed outwardly therefrom to receive the therapeutic carbons 24 and 25 thereunder, whereupon the screws 22 and 23 are withdrawn from contact with the clips to permit the clips to press and firmly hold the carbons respectively against the bar and arm. The clips 20 and 21 are positioned to hold the carbons 24 and 25 at the same radial distance from the bolt 15.

The carbons 24 and 25 are adjusted longitudinally under the clips 20 and 21 to have their ends meet, as in Figs. 1 and 2. A two wire cable 26 is connected by one end to a suitable source of alternating electric current (not shown) and is held by the other end under a clamp on the bar 12, from where one of the wires 28 of the cable 26 is led to the control switch 29. The other wire 30 of the cable 26 is carried along back of the bar 12 to include in parallel connection the two resistance elements 31 and 32 and thence back to be secured to the bolt 15 to include the arm 14 in the circuit. The arm 14 is electrically insulated from the bar 12. The switch 29 when turned to the "on" position interconnects the wire 28 with the bar 12 (not shown).

A fiber rod 33 is pivotally secured to the outer end of the arm 14 as a means of moving the arm 14 without the operator having to touch the charged arm 14. With the switch 29 turned to the "on" position, an electrical circuit is established through the resistances 31, 32, the bar 12, the arm 14, and the carbons 24 and 25.

The rod 33 is pushed upwardly slightly to create a gap between the ends of the carbons to establish an arc thereacross, from which arc radiates the desired ultra-violet rays. By reason of the uniformity of the therapeutic carbons and the use of alternating current each carbon 24 and 25 will be equally consumed and the point of the upper carbon may always be contacted upon the point of the lower carbon by pulling down on the rod 33, by reason of the arcuate travel of the upper carbon.

While I have here shown my invention in one particular form, it is obvious that the structure may be varied without departing from the spirit of the invention, and I do not desire to be limited, therefore, to the precise structure as shown, nor any more than may be necessitated by the following claims.

I claim:

1. A new article of manufacture comprising a vertically supported post, a horizontal bar adjustably carried on the post, an arm pivoted on the bar, a carbon carried by the bar and a carbon carried by the arm whereby the end of the arm carbon may meet the end of the bar carbon on an arc having the pivot point of the arm as its center of curvature.

2. A new article of manufacture comprising a vertically supported post, a horizontal bar adjustably carried on the post, an arm pivoted on the bar, a carbon carried by the bar and a carbon carried by the arm whereby the end of the arm carbon may meet the end of the bar carbon on an arc having the pivot point of the arm as its center of curvature and friction means resisting the movement of the arm.

In testimony whereof I affix my signature.

HARMAN B. WOERNER.